United States Patent
Herbst et al.

(10) Patent No.: US 10,684,158 B2
(45) Date of Patent: Jun. 16, 2020

(54) METHOD AND SYSTEM FOR MONITORING A STATE

(71) Applicant: TDK-Micronas GmbH, Freiburg (DE)

(72) Inventors: Philip Herbst, Freiburg (DE); Hans-Joerg Fink, Freiburg (DE)

(73) Assignee: TDK-Micronas GmbH, Freiburg (DE)

( * ) Notice: Subject to any disclaimer, the term of this patent is extended or adjusted under 35 U.S.C. 154(b) by 131 days.

(21) Appl. No.: 15/498,876

(22) Filed: Apr. 27, 2017

(65) Prior Publication Data

US 2017/0314985 A1 Nov. 2, 2017

(30) Foreign Application Priority Data

Apr. 27, 2016 (DE) .................. 10 2016 107 808

(51) Int. Cl.
| | |
|---|---|
| *G01F 23/62* | (2006.01) |
| *G01F 23/00* | (2006.01) |
| *G01F 23/74* | (2006.01) |
| *G08C 15/04* | (2006.01) |

(52) U.S. Cl.
CPC .......... *G01F 23/62* (2013.01); *G01F 23/0007* (2013.01); *G01F 23/0061* (2013.01); *G01F 23/74* (2013.01); *G08C 15/04* (2013.01)

(58) Field of Classification Search
CPC ......... G01F 23/62; G01F 23/74; G08C 15/00; G08C 15/02; G08C 15/04
See application file for complete search history.

(56) References Cited

U.S. PATENT DOCUMENTS

| | | | | | |
|---|---|---|---|---|---|
| 4,412,450 | A | * | 11/1983 | Franz .................. | G01F 23/266 73/304 C |
| 4,589,282 | A | * | 5/1986 | Dumery ................ | G01F 23/72 324/204 |
| 7,124,655 | B2 | * | 10/2006 | Blossfeld .............. | G08C 19/22 73/866.1 |
| 2010/0000316 | A1 | | 1/2010 | Fehrenbach | |
| 2012/0013328 | A1 | | 1/2012 | Chitwood et al. | |
| 2015/0247889 | A1 | | 9/2015 | Schroers et al. | |

FOREIGN PATENT DOCUMENTS

| | | |
|---|---|---|
| DE | 102006016381 A1 | 10/2007 |
| DE | 102013113766 A1 | 6/2015 |
| EP | 0950878 A1 | 10/1999 |
| EP | 2289729 A1 | 3/2011 |
| EP | 3073229 A1 | 9/2016 |

OTHER PUBLICATIONS

"How HART Works".

* cited by examiner

*Primary Examiner* — Justin N Olamit
(74) *Attorney, Agent, or Firm* — 24IP Law Group USA, PLLC; Timothy Dewitt

(57) ABSTRACT

A system for monitoring a state, for example a filling state of a container, with a first sensor which in operation produces a measured value, and a second sensor which in operation produces a second, discrete measured value. The first measured value and the second measured value are forwarded to an evaluation unit via a common line.

6 Claims, 2 Drawing Sheets

Fig. 3
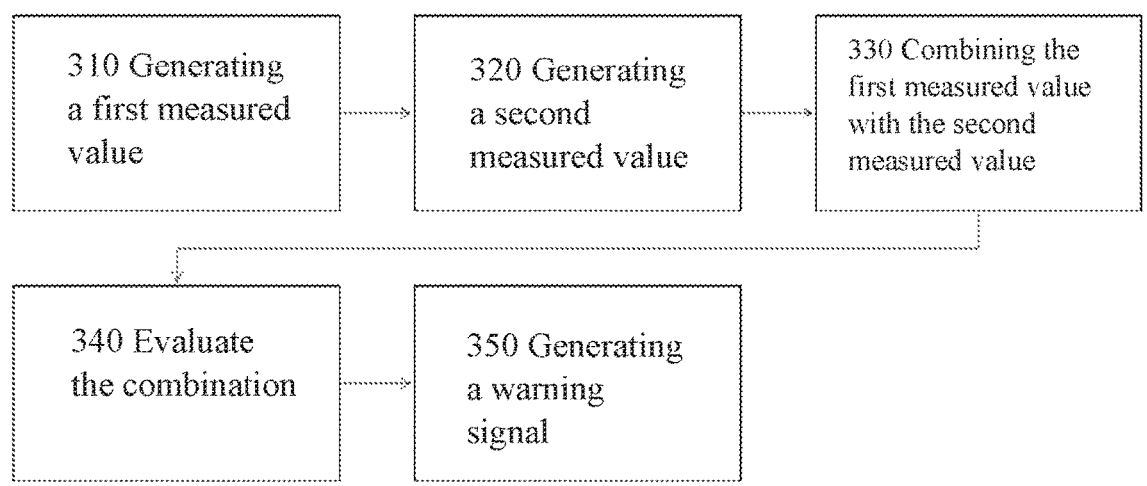
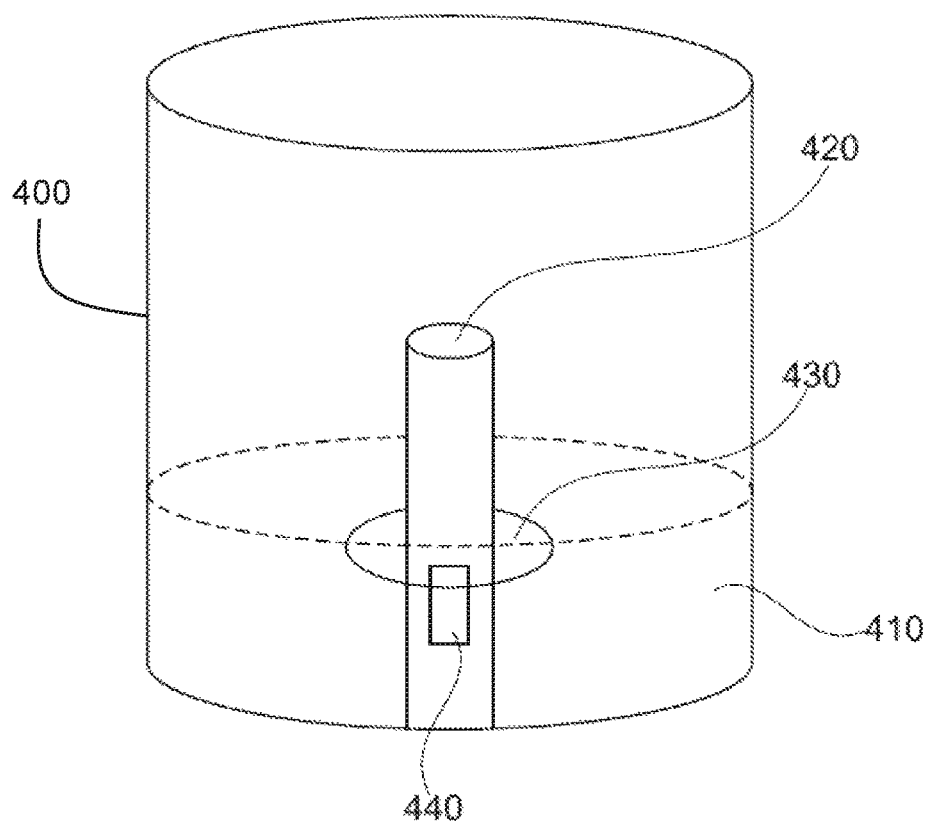
Fig. 4

METHOD AND SYSTEM FOR MONITORING A STATE

CROSS-REFERENCE TO RELATED APPLICATIONS

This application claims benefit of and priority to German Patent Application DE 10 2016 107 808.5, filed on 27 Apr. 2016. The entire disclosure of German Patent Application DE 10 2016 107 808.5 is hereby incorporated by reference.

BACKGROUND OF THE INVENTION

Field of the Invention

The invention relates to a method and a system for detecting a state with the aid of two sensors. The sensors transmit measured values of the two sensors to an evaluation unit via a two-wire line.

Brief Description of the Related Art

For monitoring safety-relevant tasks, usually redundant systems are used. In these redundant systems, a multiplicity of sensors detect the same state of the safety-relevant task and send the results to an evaluation unit. When a safety-compromising situation is detected by any one of the sensors, a warning signal is produced by the evaluation unit, for example. These sensors can be identically constructed or different. In the case of identically constructed sensors, there is a risk that the identically constructed sensors do not identify the safety-compromising situation, since all sensors deliver the same results to the evaluation unit or fail in a similar manner. To avoid this risk different sensors can be used consequently.

These different sensors can be connected to the evaluation unit via two-wire lines. For example, a system or arrangement for transmitting measured values from a sensor to an evaluation unit, for example, is known from the published U.S. Pat. No. 7,124,655 (Micronas GmbH). The sensor of the state of the art sends a PWM signal to the evaluation unit, wherein the width of the pulses corresponds to the measured value detected by the sensor. This published patent teaches merely the connection of a single sensor to the evaluation unit.

All sensors must be connected to the evaluation unit and so far, require separate lines for connection to the evaluation unit. Due to the required redundancy of the sensors there consequently result a large number of lines. In a car for example, it is advantageous for reasons of space, cost and weight to reduce the number of lines.

SUMMARY OF THE INVENTION

An arrangement or system for reducing the number of lines in a multiplicity of sensors is disclosed in this document. This arrangement or system according to the invention includes a first sensor which in operation produces a first measured value, wherein the first measured value comprises a range of measured values; and a second sensor which in operation produces a second measured value, wherein the second measured value comprises a limited number of discrete measured values (e.g. 1 or 0) and wherein the first sensor and the second sensor are connected in parallel and have a common line for transmitting the first measured value and the second measured value to an evaluation unit.

The first sensor and the second sensor detect the same state, for example the strength of a magnetic field, and produce measured values in accordance with different protocols, which are transmitted to the evaluation unit via the common line. The use of different protocols permits to the evaluation unit to distinguish the respective measured values from each other and to thus detect the measured value of the respective sensor correctly. The arrangement consequently saves using a separate line for the second sensor.

In one aspect of the arrangement the first sensor has an output for transmitting the first measured values to the evaluation unit with a pulse-width modulation protocol. The second sensor is a threshold-value sensor with an output signal of 1 or 0, depending on whether the detected second measured value overshoots the threshold value or not.

The common line is a two-wire line in one aspect of the arrangement.

The arrangement can be used for the detection of the filling level of a container, for example. In this application, the first sensor delivers a measured value which corresponds to the filling level of the liquid in the container. The second sensor changes its output value upon undershooting or overshooting a threshold value, for example upon reaching a minimum filling level. The two sensors both detect this critical value of the minimum filling level, thus resulting in a redundancy with two different sensors. The liquid is a hydraulic fluid in a brake cylinder, for example.

A method for monitoring a state is described as well.

BRIEF DESCRIPTION OF THE DRAWINGS

The invention will now be explained in more detail with reference to the following figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention. This invention becomes more obvious when reading the following detailed descriptions of some examples as part of the disclosure under consideration of the enclosed drawings. Referring now to the attached drawings which form a part of this disclosure. There are shown:

FIG. 3 is a diagram illustrating a sequence of a method in accordance with a preferred embodiment of the present invention; and FIG. 4 is a diagram illustrating a use of an arrangement in a container in accordance with a preferred embodiment of the present invention.

DETAILED DESCRIPTION

The object of the present invention is fully described below using examples for the purpose of disclosure, without limiting the disclosure to the examples. The examples present different aspects of the present invention. To implement the present technical teaching, it is not required to implement all of these aspects combined. Rather, a person skilled in the art will select and combine those aspects that appear sensible and required for the corresponding application and implementation.

Figure 1:
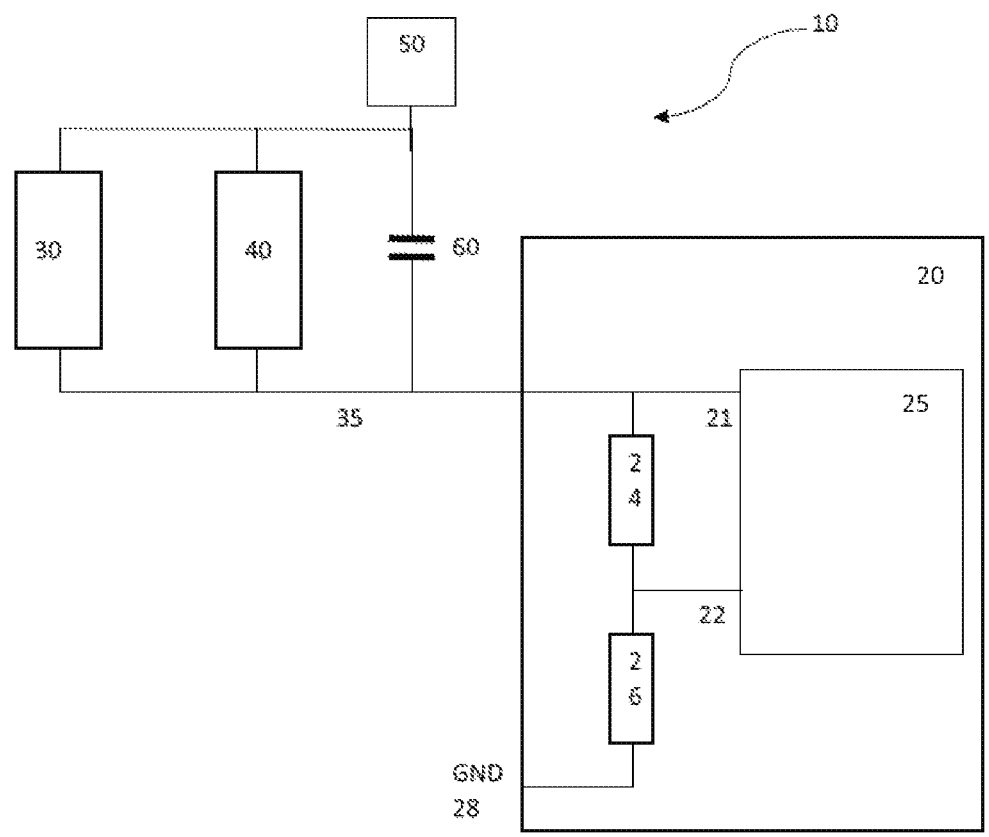
FIG. 1 is an overview of a system in accordance with a preferred embodiment of the present invention.

FIG. 1 shows an overview of the arrangement or system 10 of the invention with an evaluation unit 20, a first sensor 30 and a second sensor 40. The first sensor 30 and the second sensor 40 are connected in parallel and connected to the evaluation unit 20 via a common line 35, for example a two-wire line. The first sensor 30 and the second sensor 40 are connected to a voltage source 50, for example a battery. Between the voltage source 50 and the line 35 a capacitor 60 is present.

The evaluation unit 20 includes a computing unit 25 with a first input 21 and a second input 22, as well as a first resistor 24 and a second resistor 26. The first input 21 of the computing unit 25 is connected to the line 35. The common line 35 is connected to the second output 22 via the first resistor 24. The second resistor 26 at a first connector is likewise connected to the second input 22 and to the resistor 24, and is connected to a ground line 28 at its other connector. Thus, the computing unit 25 can detect the dropout voltage via the first resistor 24 and the second resistor 26.

The first sensor 30 and the second sensor 40 are respectively magnetic sensors which detect the strength of a magnetic field in their vicinity and each deliver output signals that correspond to the strength of the magnetic field. In one aspect of the invention the first sensor 30 is a so-called Hall sensor with an output that delivers a continuous range of measured values that correspond to the strength of the magnetic field. For example, the first magnetic sensor is a HAL 856 sensor of the company Micronas GmbH, Freiburg, Germany. This first magnetic sensor 30 can be calibrated and, via a so-called PWM output, delivers an output signal in the form of a pulse, wherein the pulse width corresponds to the strength of the detected magnetic field.

The second sensor 40 is a magnetic switch which delivers exclusively specific measured values with discrete values. For example, the second sensor 40 is a HAL 1566 switch of the company Micronas GmbH, Freiburg, Germany, which delivers an output signal with a high value (digital 1) upon undershooting or overshooting a threshold value of the detected magnetic field. As long as the strength of the magnetic field is below a predetermined threshold value, for example, the second sensor 40 delivers a low output signal (digital 0). The threshold value of this second sensor 40 is preferably programmable and thus the output signal can deliver either the value 1 or the value 0 depending on the strength of the detected magnetic field.

Figure 2:
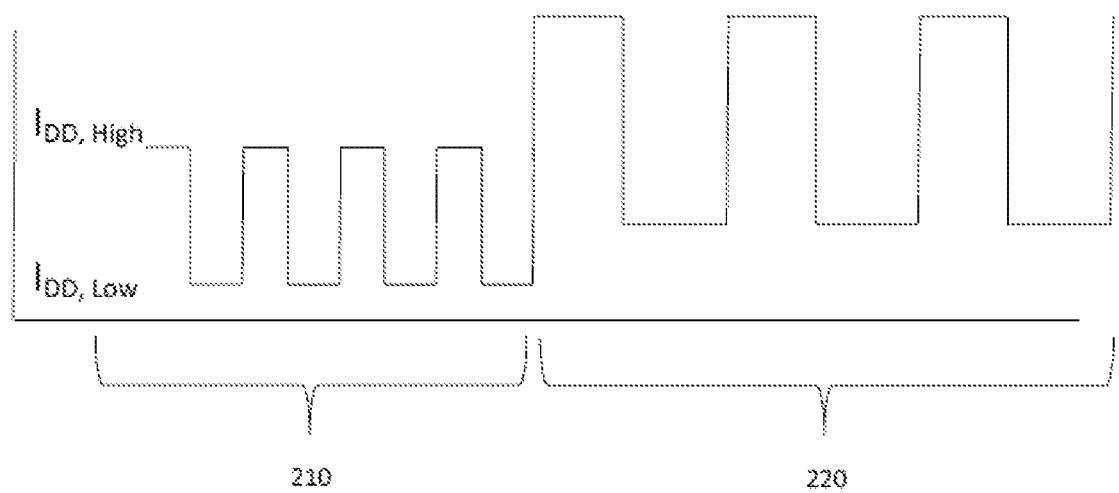
FIG. 2 is a graph of the summarized output signal of the two sensors in accordance with a preferred embodiment of the present invention.

The output signals of the first sensor 30 and of the second sensor 40 are summarized on the common line 35. FIG. 2 shows an example of the combined output signal. In a first measuring range 210 the detected magnetic field is below the programmed threshold value of the second sensor 40 and thus the value of the pulse signal as output signal of the first sensor 30 varies between the value $I_{DD, Low}$ and $I_{DD, High}$. The width of the pulse is representative for the strength of the magnetic field.

In the second measuring range 220 the magnetic field is stronger and its value lies above a predetermined threshold value of the second sensor 40. In this second case, the pulse is wider, since the output signal of the first sensor 30 delivers a wider pulse due to the stronger magnetic field. In this second measuring range 200 one component of the summarized output signal is also contributed by the second sensor 40, since the strength of the magnetic field lies above the predetermined threshold value. The output signal of the second sensor 40 is thus high and this value is summarized with the pulse signal of the first sensor 30.

This summarized output signal is detected by the computing unit via the first resistor 24 and the second resistor 26 and delivers two measured values. The first measured value is from the first sensor 30 and is representative for the strength of the magnetic field, and the second measured value from the second sensor 40 shows the undershooting or overshooting of a certain predefined strength by the magnetic field.

FIG. 3 shows the sequence of the method. In a first step 310 the first sensor 30 produces a first (continuous) measured value. The second sensor 40 produces a second (discrete) measured value in the step 320. The first measured value from the first sensor 30 and the second measured value from the second sensor 40 are added (combined) in the step 330 and delivered as one output signal to the evaluation unit 20 via the common line 35. The evaluation unit 20 evaluates the combined output signal in the step 340 and delivers a result.

In one aspect of the arrangement 10 the evaluation unit 20 can produce a warning signal upon overshooting the strength of the magnetic field, forwarding said warning signal to a user in the step 350. By combining the measurement of the strength of the magnetic field by the first sensor 30 and the second detection of the overshooting of the threshold value of the magnetic field by the second sensor 40, an apparatus is obtained for detecting a magnetic field with a redundancy.

FIG. 4 shows an exemplary use of the arrangement of this disclosure. FIG. 4 shows a container 400 with a liquid 410. The liquid 410 could be gas, brake fluid or a hydraulic fluid, for example. The liquid 410 is either removed from the container 400 or there is a risk of the liquid 410 leaking from the container. A warning device (not shown) is therefore required for determining the current filling level and outputting a warning signal when a minimum filling level is undershot. The produced warning signal is produced by a sensor arrangement 440 in a pin 420 in the container 400. The sensor arrangement 440 is constructed of the first sensor 30 and the second sensor 40, for example, and has a (not shown) common line 35, which is connected to a neither shown evaluation unit 20. Around the pin 420, a permanent magnet 430 in the form of an annular magnet is arranged. This permanent magnet 430 swims on the surface of the liquid 410 around the pin 420 and is moved upwards or downwards around the pin 420 depending on the filling level of the container 400. The permanent magnet 430 produces a magnetic field which is detected by the sensor arrangement 440. The first sensor 30 in the sensor arrangement 440 can detect the strength of the magnetic field of the permanent magnet 430 and yields a value that corresponds to the filling level of the container 400. The second sensor 40 in the sensor arrangement 440 is so programmed that the second sensor 40 delivers a high output signal only when the detected magnetic field of the permanent magnet 430 overshoots a threshold value. This threshold value can be programmed such that the threshold value corresponds to the minimum filling level in the container 400. Upon undershooting this minimum filling level a warning signal can be forwarded to a user.

LIST OF REFERENCE NUMBERS 10 arrangement or system
20 evaluation unit
21 first input
22 second input 24 first resistor
25 computing unit
26 second resistor
28 ground
30 first sensor
35 common line
40 second sensor
50 voltage source
60 capacitor
400 container
410 liquid
420 pin
430 permanent magnet
440 sensor arrangement

What is claimed is:

1. A system for monitoring a state, including:
a first sensor which in operation produces a first measured value, wherein the first measured value comprises a range of measured values;
a second sensor which in operation produces a second measured value, wherein the second measured value comprises a limited number of discrete measured values and wherein the first sensor and the second sensor are electrically connected in parallel and have a common two-wire line;
an evaluation unit, wherein the common two-wire line is adapted to transmit the first measured value and the second measured value to the evaluation unit, wherein the evaluation unit includes:
a computing unit with a first input and a second input for comparing the signals at the first input and the second input; and
a first resistor and a second resistor, wherein the first input is connected to the common two-wire line and the second input is connected across the first resistor to the common two-wire line, wherein the common two-wire line is connected to the second input via the first resistor, and wherein the second resistor at a first connector is connected to the second input and to the first resistor, and is connected to a ground line at its other connector.

2. The system according to claim 1, wherein the first sensor is a magnetic field sensor.

3. The system according to claim 1, wherein the first sensor has a first output for transmitting the first measured values to the evaluation unit with a pulse-width modulation protocol.

4. The system according to claim 1, wherein the second sensor is threshold-value sensor.

5. The system according to claim 1, wherein the second sensor is a Hall switch for detecting the overshooting of a threshold value of a magnetic field.

6. The system according to claim 1, wherein the state is the filling level of a container.

* * * * *